United States Patent [19]

Throckmorton et al.

[11] 3,962,375
[45] June 8, 1976

[54] POLYMERIZATION PROCESS

[75] Inventors: Morford C. Throckmorton; Ken W. Donbar; Karl C. Kauffman, all of Akron, Ohio

[73] Assignee: The Goodyear Tire & Rubber Company, Akron, Ohio

[22] Filed: Apr. 11, 1975

[21] Appl. No.: 567,443

Related U.S. Application Data

[63] Continuation of Ser. No. 424,389, Dec. 13, 1973, abandoned.

[52] U.S. Cl. ............................. 526/335; 526/148; 526/159
[51] Int. Cl.² .................... C08F 4/06; C08F 4/12
[58] Field of Search .................... 260/94.3, 82.1; 450/653.5

[56] References Cited
UNITED STATES PATENTS

| | | | |
|---|---|---|---|
| 3,461,110 | 8/1969 | Rice et al. | 260/94.3 X |
| 3,471,462 | 10/1969 | Matsumoto et al. | 260/94.3 |
| 3,479,331 | 11/1969 | Mori et al. | 260/94.3 |
| 3,769,270 | 10/1973 | Saltman et al. | 260/94.3 |

*Primary Examiner*—William F. Hamrock
*Attorney, Agent, or Firm*—F. W. Brunner; J. Y. Clowney

[57] ABSTRACT

A method of preparing polybutadiene polymers utilizing a three-component system consisting of an organoaluminum compound, an organonickel compound and a fluoride compound selected from the group of hydrogen fluoride and its complexes and boron trifluoride and its compounds, the improvement being mixing the catalyst components in the presence of a preforming agent selected from the group of monoolefins, nonconjugated diolefins, cyclic nonconjugated multiolefins, acetylenic hydrocarbons, triolefins, vinyl ethers and aromatic nitriles.

8 Claims, No Drawings

POLYMERIZATION PROCESS

This is a continuation of application Ser. No. 424,389, filed Dec. 13, 1973, now abandoned.

This invention is directed to a method of polymerization of butadiene and/or butadiene in mixture with other diolefins to form polymers with a high content of cis-1,4 addition. It is also directed to the preparation of and to improved preformed catalyst systems useful for this purpose. More specifically, the invention relates to improved preformed catalysts for producing high cis-1,4-polybutadiene. Polybutadiene polymers have been found to possess properties which make them useful as synthetic rubbers.

There are prior art methods for the preparation and use of preformed nickel catalysts for the polymerization of butadiene. In these prior art methods high cis-1,4-polybutadiene is produced by contacting butadiene with a specific catalyst. Said catalyst is prepared by mixing, in the presence of a hydrocarbon solvent, a first component of at least one compound selected from the group consisting of organometallic compounds of alkali metals and metals of Groups II and III of the Periodic Table, a second component of at least one compound selected from the group consisting of nickel salts of carboxylic acids and organic complex compounds of nickel and a third component of at least one compound selected from the group consisting of boron fluoride and complex compounds thereof and a fourth component of an aliphatic hydrocarbon having two conjugated double bonds, said catalyst being prepared in such a way that the fourth component is added before the reaction between the first and second components and subjecting the resulting mixture to aging at a temperature of 20°C. to 100°C. It is believed that the use of aliphatic hydrocarbon having two conjugated double bonds in some manner stabilizes the catalyst so that the catalyst maintains its activity over relatively long periods of time.

It has now been found that such preformed catalysts can be prepared in other than the presence of aliphatic hydrocarbons having two conjugated double bonds to form a stabilized catalyst which maintains high activity over a relatively long period of time.

It has been found that the catalyst components can be preformed in the presence of monoolefins, nonconjugated diolefins, cyclic nonconjugated multiolefins, acetylenic hydrocarbons, triolefins, vinyl ethers and aromatic nitriles.

According to the invention, butadiene and butadiene in mixture with other diolefins is polymerized under solution polymerization conditions to form polymers containing a high proportion of butadiene units in the cis-1,4 configuration which comprises contacting said mixture with an improved catalyst consisting essentially of (1) an organoaluminum compound (2) an organonickel compound selected from the group consisting of nickel salts of carboxylic acids, organocomplex compounds of nickel and nickel tetracarbonyl, and (3) a fluoride compound selected from the group of hydrogen fluoride and its complexes and boron trifluoride and its complexes, said catalyst being preformed by mixing the catalyst components in the presence of a preforming agent selected from the group of monoolefins, non-conjugated diolefins, cyclic nonconjugated multiolefins, acetylenic hydrocarbons, triolefins, vinyl ethers and aromatic nitrile prior to contacting with the butadiene or butadiene in mixture with other diolefins.

By the term "organoaluminum compound" is meant any organoaluminum compound responding to the formula:

in which $R_1$ is selected from the group consisting of alkyl (including cycloalkyl), aryl, alkaryl, arylalkyl, alkoxy, hydrogen an fluorine, $R_2$ and $R_3$ being selected from the group of alkyl (including cycloalkyl), aryl, alkaryl, and arylalkyl. Representative of the compounds responding to the formula set forth above are: diethylaluminum fluoride, di-n-propylaluminum fluoride and diphenylaluminum fluoride. Also included are diethylaluminum hydride, di-n-propylaluminum hydride, di-n-butylaluminum hydride, diisobutylaluminum hydride, diphenylaluminum hydride, phenylethylaluminum hydride, benzylethylaluminum hydride, and benzylisopropylaluminum hydride and other organoaluminum hydrides. Also diethylaluminum ethoxide and diisobutylalaminum ethoxide. Also included are trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, triphenyl aluminum, ethyldiphenyl aluminum, diethylphenyl aluminum and other triorganoaluminum compounds. Also, by the term "organoaluminum compounds" is meant any compound responding to the formula $R'R''_3$ LiAl where $R'$ and $R''$ may be alkyl, alkaryl, or arylalkyl groups. $R'$ and $R''$ may or may not be the same. Representative of these compounds are tetraethyl lithium aluminum, n-butyl-trisobutyl lithium aluminum, tetrabutyl-lithium aluminum, tetraisobutyl-lithium aluminum, butyltriethyl lithium aluminum and styryl trinormalpropyl lithium aluminum.

The component of the catalyst of this invention which contains nickel may be any organonickel compound. It is preferred to employ a soluble compound of nickel. These soluble nickel compounds are normally compounds of nickel with a mono- or bi-dentate organic ligand containing up to 20 carbon atoms. "Ligand" is defined as an ion or molecule bound to and considered bonded to a metal atom or ion. Monodentate means having one position through which covalent or coordinate bonds with the metal may be formed; bi-dentate means having two positions through which covalent or coordinate bonds with the metal may be formed. By the term "soluble" is meant soluble in inert solvents. Thus, any salt or an organic acid containing from about 1 to 20 carbon atoms may be employed. Representative of organonickel compounds are nickel benzoate, nickel acetate, nickel naphthenate, nickel octanoate, bis(α-furyl dioxime) nickel nickel palmitate, nickel stearate, nickel acetylacetonate, nickel salicaldehyde, bis(cyclopentadiene) nickel, bis(salicylaldehyde) ethylenediimine nickel, cyclopentadienylnickel nitrosyl and nickel tetracarbonyl. The preferred component containing nickel is a nickel salt of a carboxylic acid or an organic complex compound of nickel.

The third component or fluoride compound of the catalyst system is boron trifluoride and its complexes or hydrogen fluoride and its complexes. The complexes of hydrogen fluoride or boron trifluoride are prepared by complexing boron trifluoride or hydrogen fluoride with a member of the class of ketones, aldehydes, ethers, esters and nitriles. The boron trifluoride or hydrogen fluoride molecules have a strong tendency to accept electrons from an oxygen or nitrogen atom of these donor molecules.

The ketone subclass can be defined by the formula R'COR were R' and R represent alkyl, cycloalkyl, aryl, alkaryl and arylalkyl radicals containing from 1 to about 30 carbon atoms; R' and R may be the same or dissimilar. These ketones represent a class of compounds which have a carbon atom attached by a double bond to oxygen. The preferred complexes of the ketones are boron trifluoride acetophenone, boron trifluoride benzophenone or hydrogen fluoride benzophenone.

The aldehyde subclass can be defined by the formula R-CHO where R represents an alkyl, cycloalkyl, aryl, alkaryl and arylalkyl radical containing from 1 to about 30 carbon atoms. The aldehydes have a carbon atom attached to an oxygen atom by means of a double bond. The preferred complexes formed from the aldehydes are boron trifluoride.benzaldehyde, boron trifluoride.-tolualdehyde, boron trifluoride.m-nitrobenzaldehyde or hydrogen fluoride. benzaldehyde.

The ester subclass can be represented by the formula R'—COOR where R' and R are represented by alkyl, cycloalkyl, aryl, alkaryl, and arylalkyl radicals containing from 1 to about 30 carbon atoms. The esters contain a carbon atom attached by a double bond to an oxygen atom. The preferred complexes formed from the esters are boron trifluoride.ethyl benzoate and boron trifluoride.phenyl acetate or hydrogen fluoride-.ethyl benzoate.

The nitrile subclass can be represented by the formula RCN wherein R represents an alkyl, cycloalkyl, aryl, alkaryl and arylalkyl. The nitriles contain a carbon atom attached to a nitrogen atom by a triple bond. The preferred complex prepared from the nitriles is boron trifluoride. benzonitrile or hydrogen fluoride.benzonitrile.

The ether subclass can be defined by the formula ROR' where R and R' represent alkyl, cycloalkyl, aryl, alkaryl and arylalkyl radicals containing from 1 to about 30 carbon atoms; R and R' may be the same or dissimilar. These represent a class of compounds which have two carbon atoms attached by single bonds to oxygen. The preferred complexes of the ethers are boron trifluoride.diethyletherate, boron trifluoride.-dibutyletherate, hydrogen fluoride.diethyletherate and hydrogen fluoride.dibutyletherate.

Representative of olefins which may be used as preforming agents for the preparation of stabilized catalyst are trans-2-butene, mixed cis- and trans-2-pentene, and cis-2-pentene. Representative of the class of nonconjugated diolefins are cis-1,4-hexadiene, 1,5-heptadiene and 1,7-octadiene. Representative of cyclic nonconjugated multiolefins are 1,5-cyclooctadiene, 1,5,9-cyclododecatriene, 4-vinyl cyclohexene-1 and the like.

Representative of the class of acetylenic hydrocarbons which may be used as preforming agents are methyl acetylene, ethyl acetylene, 2-butyne, 1-pentyne, 2-pentyne and phenyl acetylene.

Representative of triolefins are 1,3,5-hexatriene, 1,3,5-heptatriene, 1,3,6-octatriene, 5-methyl-1,3,6-heptatriene and the like.

Representative of substituted conjugated diolefins are 1,4-diphenyl butadiene-1,3,chloroprene, and myrcene (7-methyl - 3-methylene -1,6-octadiene) and the like.

Other classes of compounds which stabilize or improve the polymerization activity of the organoaluminum-nickel-fluoride catalyst systems include alkyl vinyl ethers and aromatic nitriles. Representative of these classes are ethyl vinyl ether, isobutyl vinyl ether and benzonitrile.

The preformed catalyst system has come to be a means by which the types of catalysts used in this invention can be used advantageously for commercial size batches and continuous polymerization operations. Some of the advantages are stabilization of the catalyst for long periods of time, one-shot uniform make-up of the catalyst, uniform control of the polymerization unit, and a predictable uniform polymeric product.

In order to properly stabilize the catalyst, a preforming agent (PA) must be present before the organoaluminum compound has an opportunity to react with either the nickel compound or the fluoride compound.

If the catalyst system is preformed witout the presence of at least a small amount of preforming agent, the chemical effect of the organoaluminum upon the nickel compound or the fluoride compound is such that the catalytic activity of the catalyst is greatly lessened and shortly thereafter rendered inactive. In the presence of at least a small amount of preforming agent, the catalytic or shelf life of the catalyst is greatly improved over the system without any preforming agent present.

A method of preparing the preformed catalyst so that it will be highly active and relatively chemically stable is to add the organoaluminum compound and the preforming agent to the solvent medium before they come into contact with the nickel compound. The nickel compound is then added to the solution and then the fluoride compound is added to the solution. As an alternative, the preforming agent and the nickel compound may be mixed, followed by the addition of the organoaluminum compound and then the fluoride compound. Other orders of addition may be used but they generally produce less satisfactory results.

The amount of preforming agent used to preform the catalyst may be within the range of about 0.001 to 3 percent of the total amount of monomer to be polymerized. Expressed as a mole ratio of preforming agent to nickel compound, the amount of preforming agent present during the preforming step can be within the range of about 1 to 3000 times the concentration of nickel. The preferred mole ratio of preforming agent to nickel is about 3:1 to 500:1.

Although the catalyst prepared in accordance with this invention shows catalytic activity immediately upon being prepared, it has been observed that a short aging period, for example, 15 to 30 minutes, at moderate temperatures, for example, 50°C. does increase the activity of the catalyst which has been preformed in the presence of a preforming agent. This is to be contrasted with a catalyst using the same components which has not been preformed in the presence of a preforming agent but has been aged in a similar manner, results in a powder that has greatly reduced catalytic activity for promoting polymerization of conjugated diolefins.

The catalyst prepared in accordance with this invention shows a much greater catalytic activity in polymerization rate than the same catalyst components not being preformed in the presence of a preforming agent.

This results in an economic advantage in the use of the catalyst prepared in accordance with the practice of this invention. Other advantages obtained by the practice of the invention of this application are readily apparent to those skilled in this art.

Furthermore, the physical properties and possibilities of cis 1,4 polybutadiene are greatly influenced by molecular weight. Thus, it is important to control the molecular weight of cis 1,4 polybutadiene. By the use of the catalyst of the present invention, it is possible to very easily control molecular weight of the polybutadiene formed by the use of the catalysts of this invention. It has usually been found that the higher the temperature at which the catalyst was aged, the higher the resulting molecular weight of the polymer.

The preforming agent-preformed catalyst system has polymerization activity over a wide range of catalyst concentration and catalyst ratios. The three catalyst components, and the preforming agent, interreact to form the active catalyst. As a result, the optimum concentration for any one component is very dependent upon the concentrations of each of the other two catalyst components. Furthermore, while polymerization will occur over a wide range of catalyst concentrations and ratios, polymers having the most desirable properties are obtained over a narrower range. Polymerization can occur while the mole ratio of the organoaluminum compound (Al) to the organonickel compound (Ni) ranges from about 0.3/1 to about 500/1; the mole ratio of the preforming agent (PA) to the oganonickel compound (Ni) ranges from about 1/1 to about 3000/1; the mole ratio of the fluoride compound (F) to the organonickel compound (Ni) ranges from about 0.5/1 to about 900/1 and the mole ratio of the fluoride compound to the organoaluminum compound ranges from about 0.2/1 to about 30/1. However, the preferred mole ratios of Al/Ni ranges from about 2/1 to about 150/1; the preferred range of PA/Ni ranges from about 3/1 to about 500/1; the preferred mole ratio of F/Ni ranges from about 3/1 to about 400/1 and the preferred mole ratio of F/Al ranges from about 0.4/1 to about 7/1.

The concentration of the catalyst employed depends on factors such as purity, rate desired, temperature and other factors, therefore, specific concentrations cannot be set forth except to say that catalytic amounts are used. Some specific concentrations and ratios which produce elastomers having desirable properties will be illustrated in the examples given herein to explain the teachings of this invention.

In general, the polymerizations of this invention are carried out in any inert solvent, and are, thus, solution polymerizations. By the term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic, or cycloaliphatic hydrocarbons, examples of which are pentane, hexane, toluene, benzene, cyclohexane and the like. Preferred solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent, e.g., butane or pentane, in which the polymer formed is insoluble. It should be understood, however, that it is not intended to exclude bulk polymerizations from the scope of this application.

It is usually desirable to conduct the polymerizations of this invention employing air-free and moisturefree techniques.

The temperatures employed in the polymerizations of this invention are not critical and may vary from a very low temperature such as −10°C. or below up to high temperatures such as 100°C. or higher. However, it is usually more desirable to employ a more convenient temperature between about 30°C. and about 90°C.

The practice of this invention is further illustrated by reference to the following examples which are intended to be representative rather than restrictive of the scope of this invention. Unless otherwise noted, all parts and percentages are by weight. Dilute solution viscosities (DSV) have been determined in toluene at 30°C.

EXAMPLE I

This example shows how the preformed catalyst was made and how it was subsequently used. This example is by no means a limitation, but illustrates the components being charged in the following proportions and order. The following ingredients were injected into a dry, nitrogen flushed 4-ounce bottle with shaking, to mix after each addition:

(1) Thirty (30) milliliters of dry freshly deaerated benzene;
2. Three and two-tenths (3.2) milliliters of a 0.21 molar solution of ethyl acetylene in benzene;
3. Two and seven-tenths (2.7) milliliters of a 1.0 molar solution of triethylaluminum (TEAL) in benzene;
4. Four and five-tenths (4.5) milliliters of a 0.05 molar solution of nickel octoate (NiOct) in benzene; and
5. Four and five-tenths (4.5) milliliters of a 0.50 molar solution of boron trifloride, etherate in benzene.

A purified butadiene in benzene premix containing 10 grams of butadiene per hundred milliliters of solution was charged to a number of 4-ounce bottles. Each 4-ounce bottle contained 100 milliliters of premix. Nitrogen blanketed the premix while 1.5 milliliters of the above described preformed catalyst (PA/TEAL/NiOct/$BF_3$.$Et_2O$) was charged to the premix.

Experiment 1 shows the polymerization activity when the catalyst was used without any preforming agent. Experiment 2 shows the polymerization activity with the particular preformed catalyst described in this example. The other experiments in this example use a similar method of preparation but use different preforming agents as noted. The bottles were capped tightly, placed in a water bath maintained at 50°C. and then tumbled end-over-end for four hours. The polymerizations wer terminated by mixing the polymer cements with one part both of triisopropanolamine and dibutyl-paracresol per hundred parts of monomer. The polymer was dried under vacuum.

Column 1 shows the experiment number, column 2 shows the amount of preformed catalyst used, column 3 shows the polymer yield and column 4 shows the dilute solution viscosity:

TABLE 1

| Exp. No. | Fresh preformed catalyst Millimole/100 gm. BD | | | | Polymer Yield Wt. % | DSV dl/g. |
|---|---|---|---|---|---|---|
| | PA | TEAL | NiOct | BF$_3$.Et$_2$O | | |
| 1 | 0 | 0.9 | 0.075 | 0.75 | 58 | 3.8 |
| 2[a] | 0.225 | 0.9 | 0.075 | 0.75 | 85 | 3.5 |
| 3[b] | 0.225 | 0.9 | 0.075 | 0.75 | 82 | 3.5 |
| 4[c] | 0.225 | 0.9 | 0.075 | 0.75 | 83 | 3.2 |
| 5[d] | 0.225 | 0.9 | 0.075 | 0.75 | 70 | 3.3 |
| 6[e] | 22.5 | 0.9 | 0.075 | 0.75 | 72 | 3.6 |
| 7[f] | 22.5 | 0.9 | 0.075 | 0.75 | 60 | 3.3 |
| 8[g] | 7.5 | 0.9 | 0.075 | 0.75 | 76 | 2.6 |
| 9[h] | 7.5 | 0.9 | 0.075 | 0.75 | 85 | 3.3 |
| 10[j] | 0.75 | 0.9 | 0.075 | 0.75 | 80 | 3.8 |
| 11[k] | 0.225 | 0.9 | 0.075 | 0.75 | 78 | 3.5 |

[a]ethyl acetylene
[b]methyl acetylene
[c]phenyl acetylene
[d]2-butyne
[e]2-pentene
[f]trans 2-butene
[g]4-vinylcyclohexene-1
[h]1,4-diphenylbutadiene
[j]chloroprene
[k]isobutylvinylether

EXAMPLE II

Example II is similar to the method used in Example I except that the preformed catalyst has been aged at 25°C. for 24 hours and then evaluated.

Table 2

| Exp. No. | 24-Hr.Aged Preformed Catalyst Millimole/100 gm. BD | | | | Polymer Yield Wt. % | DSV dl/g |
|---|---|---|---|---|---|---|
| | PA | TEAL | NiOct | BF$_3$.Et$_2$O | | |
| 1 | 0 | 0.9 | 0.075 | 0.75 | 48 | 4.8 |
| 2[a] | 0.225 | 0.9 | 0.075 | 0.75 | 83 | 4.3 |
| 3[b] | 0.225 | 0.9 | 0.075 | 0.75 | 75 | 4.9 |
| 4[c] | 0.225 | 0.9 | 0.075 | 0.75 | 92 | 4.1 |
| 5[d] | 0.225 | 0.9 | 0.075 | 0.75 | 65 | 4.5 |
| 6[e] | 0.225 | 0.9 | 0.075 | 0.75 | 75 | 5.2 |
| 7[f] | 0.225 | 0.9 | 0.075 | 0.75 | 73 | 5.2 |
| 8[g] | 7.5 | 0.9 | 0.075 | 0.75 | 73 | 3.1 |
| 9[h] | 7.5 | 0.9 | 0.075 | 0.75 | 82 | 4.6 |

[a]ethyl acetylene
[b]methyl acetylene
[c]phenyl acetylene
[d]2-butyne
[e]2-pentene
[f]trans 2-butene
[g]4-vinylcyclohexene-1
[h]1,4-diphenylbutadiene

EXAMPLE III

Example III is similar to the method used in Example I except that the fluoride compound is hydrogen fluoride.etherate, the organoaluminum compound is triisobutylaluminum, and the polymerization time is two hours.

Table 3

| Exp. No. | Fresh Preformed Catalyst Millimole/100 gm. BD | | | | Polymer Yield Wt. % | DSV dl/g |
|---|---|---|---|---|---|---|
| | PA | TIBAL | NiOct | HF.ET$_2$O | | |
| 1 | 0 | 1.0 | 0.075 | 2.5 | Nil | — |
| 2[a] | 0.75 | 1.0 | 0.075 | 2.5 | 85 | 5.3 |
| 3[b] | 0.60 | 1.0 | 0.075 | 2.5 | 57 | 5.3 |
| 4[c] | 7.5 | 1.0 | 0.075 | 2.5 | 77 | 4.5 |
| 5[d] | 0.75 | 1.0 | 0.075 | 2.5 | 73 | 6.8 |
| 6[e] | 0.225 | 1.0 | 0.075 | 2.5 | 50 | 5.5 |
| 7[f] | 0.75 | 1.0 | 0.075 | 2.5 | 72 | 5.7 |
| 8[g] | 3.75 | 1.0 | 0.075 | 2.5 | 65 | 5.2 |
| 9[h] | 2.47 | 1.0 | 0.075 | 2.5 | 79 | 5.1 |
| 10[j] | 0.75 | 1.0 | 0.075 | 2.5 | 88 | 4.9 |
| 11[k] | 0.75 | 1.0 | 0.075 | 2.5 | 78 | 5.9 |

Table 3-continued

[a]ethyl acetylene
[b]phenyl acetylene
[c]4-vinyl cyclohexene-1
[d]cis-1,4-hexadiene
[e]1,5-cyclooctadiene
[f]norbornadiene
[g]myrcene
[h]1,4-diphenyl-butadiene
[j]1,3,6-octatriene
[k]1,3,5-hexatriene

EXAMPLE IV

Example IV is similar to Example III except that the catalyst is aged at 25°C. for 24 hours.

Table 4

| Exp. No. | 24 Hr. Aged Preformed Catalyst Millimole/100 gm. BD | | | | Pzn. Time, Hrs. | Polymer Yield Wt. % | DSV dl/gm |
|---|---|---|---|---|---|---|---|
| | PA | TIBAL | NiOct | HF.Et$_2$O | | | |
| 1 | 0 | 1.0 | 0.075 | 2.5 | 2 | 0 | — |
| 2[a] | 0.75 | 1.0 | 0.075 | 2.5 | 2 | 73 | 6.1 |
| 3[b] | 0.60 | 1.0 | 0.075 | 2.5 | 20 | 83 | 6.0 |
| 4[c] | 7.5 | 1.0 | 0.075 | 2.5 | 2 | 68 | 5.0 |
| 5[d] | 0.75 | 1.0 | 0.075 | 2.5 | 2 | 38 | ND |
| 6[e] | 3.75 | 1.0 | 0.075 | 2.5 | 2 | 72 | ND |
| 7[f] | 2.47 | 1.0 | 0.075 | 2.5 | 2 | 48 | 6.1 |
| 8[g] | 0.75 | 1.0 | 0.075 | 2.5 | 2 | 88 | 4.8 |
| 9[h] | 0.75 | 1.0 | 0.075 | 2.5 | 2 | 77 | 5.8 |

[a]ethyl acetylene
[b]phenyl acetylene
[c]4-vinyl cyclohexene-1
[d]norbornadiene
[e]myrcene
[f]1,4-diphenyl butadiene
[g]1,3,6-octatriene
[h]1,3,5-hexatriene While certain representative embodiments and details have been shown for the purpose of illustrating the invention, it will be apparent to those skilled in this art that various changes and modifications may be made therein without departing from the spirit or scope of the invention.

What is claimed is:

1. A process for the polymerization of butadiene and butadiene in mixture with other diolefins to form polymers containing a high proportion of butadiene units in the cis-1,4-configuration comprising contacting at least one monomer from the group of butadiene and butadiene in mixture with other diolefins with a catalyst consisting essentially of (1) an organoaluminum compound selected from the group consisting of trialkylaluminums, dialkylaluminum hydrides and lithium aluminum tetraalkyl, (2) an organonickel compound selected from the class consisting of nickel salts of carboxylic acids, organic complex compounds of nickel tetracarbonyl and (3) a fluoride compound selected from the group of hydrogen fluoride and its complexes formed with ketones, aldehydes, esters, nitriles and ethers; and boron trifluoride and its complexes formed with ketones, aldehydes, esters, nitriles and ethers, wherein the improvement lies in that said catalyst is preformed by mixing the catalyst components in the presence of a preformed agent selected from the group consisting of trans-2-butene, mixed cis- and trans-2-pentene, cis-2-pentene, methyl acetylene, ethyl acetylene, 2-butyne, 1-pentyne, 2-pentyne, phenyl acetylene and isobutyl vinyl ether.

2. The process according to claim 1 in which butadiene-1,3 alone is polymerized.

3. The process of claim 1 in which the catalyst is aged at least one minute before it is employed in the polymerization.

4. The process according to claim 1 in which the mole ratio of the organoaluminum compound/organonickel compound ranges from about 0.3/1 to about 500/1, the mole ratio of the fluoride compound/organonickel.compound ranges from about 0.5/1 to about 900/1, the mole ratio of the fluoride compound/organoaluminum compound ranges from about 0.2/1 to about 30/1, and the mole ratio of the preforming agent/organonickel compound ranges from about 1/1 to 3000/1.

5. The process according to claim 4 in which the mole ratio of organoaluminum compound/organonickel compound ranges from about 2/1 to about 150/1; the mole ratio of the fluoride compound/organonickel compound ranges from about 3/1 to about 400/1; the mole ratio of the fluoride compound/organoaluminum compound ranges from about 0.4/1 to about 7/1; and the more ratio of the preforming agent/organonickel compound ranges from about 3/1 to 500/1.

6. The process according to claim 1 in which the organoaluminum is a trialkylaluminum or a dialkyl aluminum hydride.

7. The process according to claim 1 in which the organoaluminum compound is a lithium aluminum tetraalkyl.

8. The process according to claim 1 wherein the preforming agent used to stabilize the catalyst is selected from the group consisting of ethyl acetylene, methyl acetylene, phenyl acetylene, 2-butyne, 2-pentene, 4-vinylcyclohexene-1, 1,4-diphenylbutadiene, isobutyl vinylether, 1,3,6-octatriene, 1,3,5-hexatriene, trans-2-butene and myrcene.

* * * * *